Jan. 19, 1960 N. HOGLUND 2,921,505
APPARATUS FOR FORMING CONTOURS ON CYLINDRICAL SURFACES
Filed April 25, 1955 5 Sheets-Sheet 1

INVENTOR.
NILS HOGLUND
BY
William A. Zaleuk
ATTORNEY

INVENTOR.
NILS HOGLUND

Jan. 19, 1960 N. HOGLUND 2,921,505
APPARATUS FOR FORMING CONTOURS ON CYLINDRICAL SURFACES
Filed April 25, 1955 5 Sheets-Sheet 5
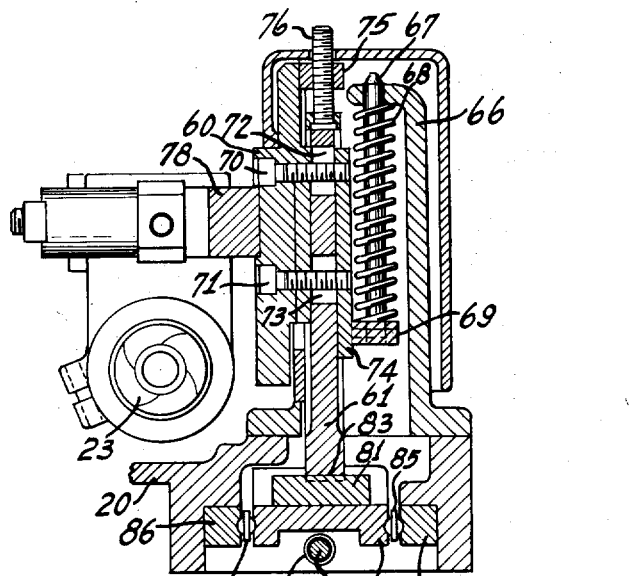
Fig. 5.
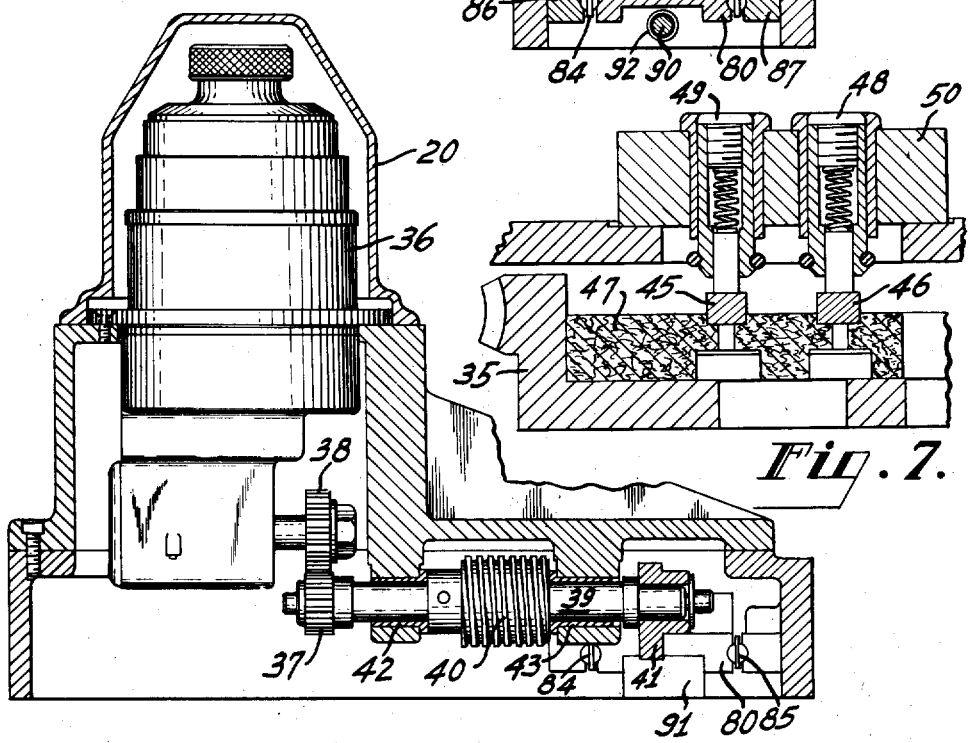
Fig. 6.
Fig. 7.
INVENTOR.
NILS HOGLUND
BY
William A. Zalesak
ATTORNEY

United States Patent Office 2,921,505
Patented Jan. 19, 1960

2,921,505

APPARATUS FOR FORMING CONTOURS ON CYLINDRICAL SURFACES

Nils Hoglund, Summit, N.J.

Application April 25, 1955, Serial No. 503,596

7 Claims. (Cl. 90—15)

My invention relates to an apparatus for finishing or forming contours lying on a cylindrical surface and more particularly to an apparatus for breaking or forming the edges of aircraft parts such as the sharp edges on stator rings which result when slots are broached in the ring for holding the stator blades and which stator rings are used in the compressor of aircraft jet engines.

Up to the present time there has been no equipment available which is capable of efficiently breaking the edges of the contour on the acute side of the dovetail on the stator ring as produced by the broach. This operation has been done manually where each corner has to be rounded off by needle files consuming up to three hours of time per ring.

It is therefore an object of my invention to provide an apparatus for finishing or forming contours lying on a cylindrical surface.

Another object of my invention is to provide an apparatus carrying a tool which is made to move through a circular path simultaneously with movement normal thereto.

A still further object of my invention is to provide an apparatus of the kind described wherein indexing and positioning as well as specific movement required of the tool may be had for each indexing position.

A still further object of my invention is to provide an apparatus having a tool in which the prime mover causes specific movement of the tool while at the same time indexing and positioning the tool.

More specifically, it is an object of my invention to provide such an apparatus for breaking or forming the edges of the contour on the acute side of the dovetail from on the inside of the stator rings which are machined by means of broaching.

Briefly, in accordance with my invention I provide an apparatus including a base having mounted thereon a rotatable support or table upon which is mounted a tool. The tool is supported on the table which rotates in a horizontal plane by a slide which moves normal to the plane of rotation of the table and which in turn cooperates with a radially movable slide carried by the table so that as the radial slide moves back and forth, the tool moves vertically. The table also supports a driving motor connected to a fixed gear on the base by means of a worm gear connected to and driven by the motor. A cam driven simultaneously with the worm gear contacts the radial slide. Thus, as the table is driven about its axis causing movement of the tool in a circular path, the cam actuates the slides to produce movement of the tool normal to said radial path. The work piece is supported adjacent the path of the tool by means of clamping means mounted on a housing in turn fixedly mounted on the base.

Other objects of the invention will appear in the following description with reference to the drawings, in which:

Fig. 5 is a vertical section taken along the line 5—5 of Fig. 4;

Fig. 6 is a vertical section taken along the line 6—6 of Fig. 3; and

Fig. 7 is a vertical section taken along the line 7—7 of Fig. 3.

*General description*

Figure 1:
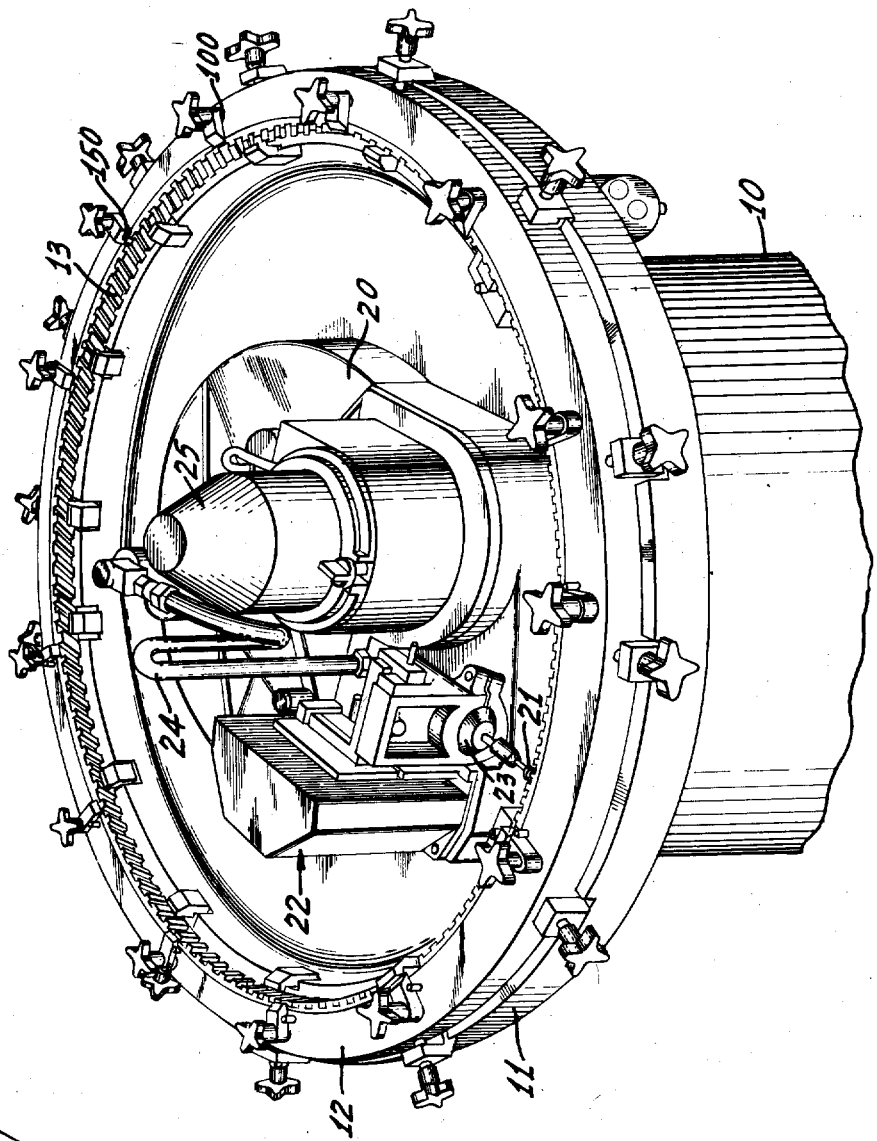
Fig. 1 is a perspective view of an apparatus made according to my invention.
Figure 2:
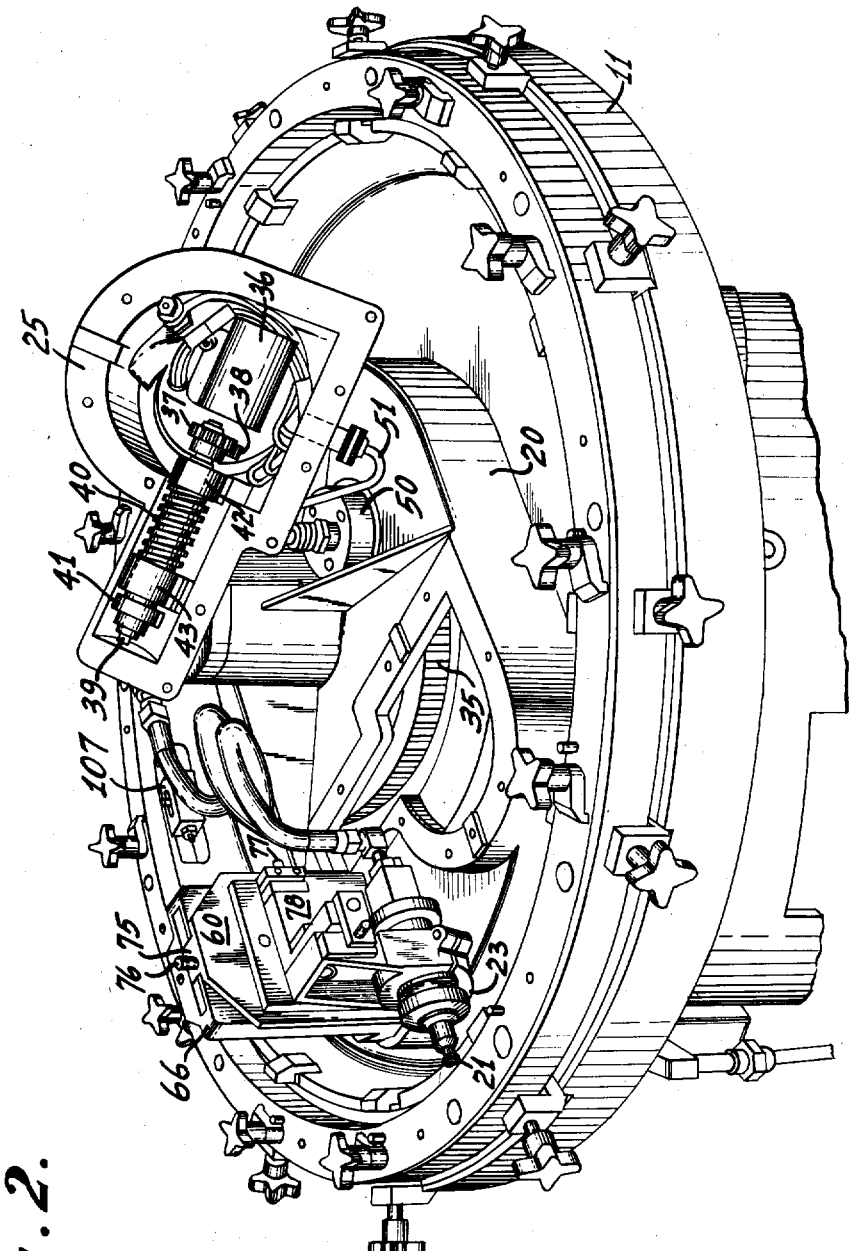
Fig. 2 is a perspective view of the apparatus made according to my invention with certain parts displaced and removed to show details of construction of the driving means and the tool support.
Figure 3:
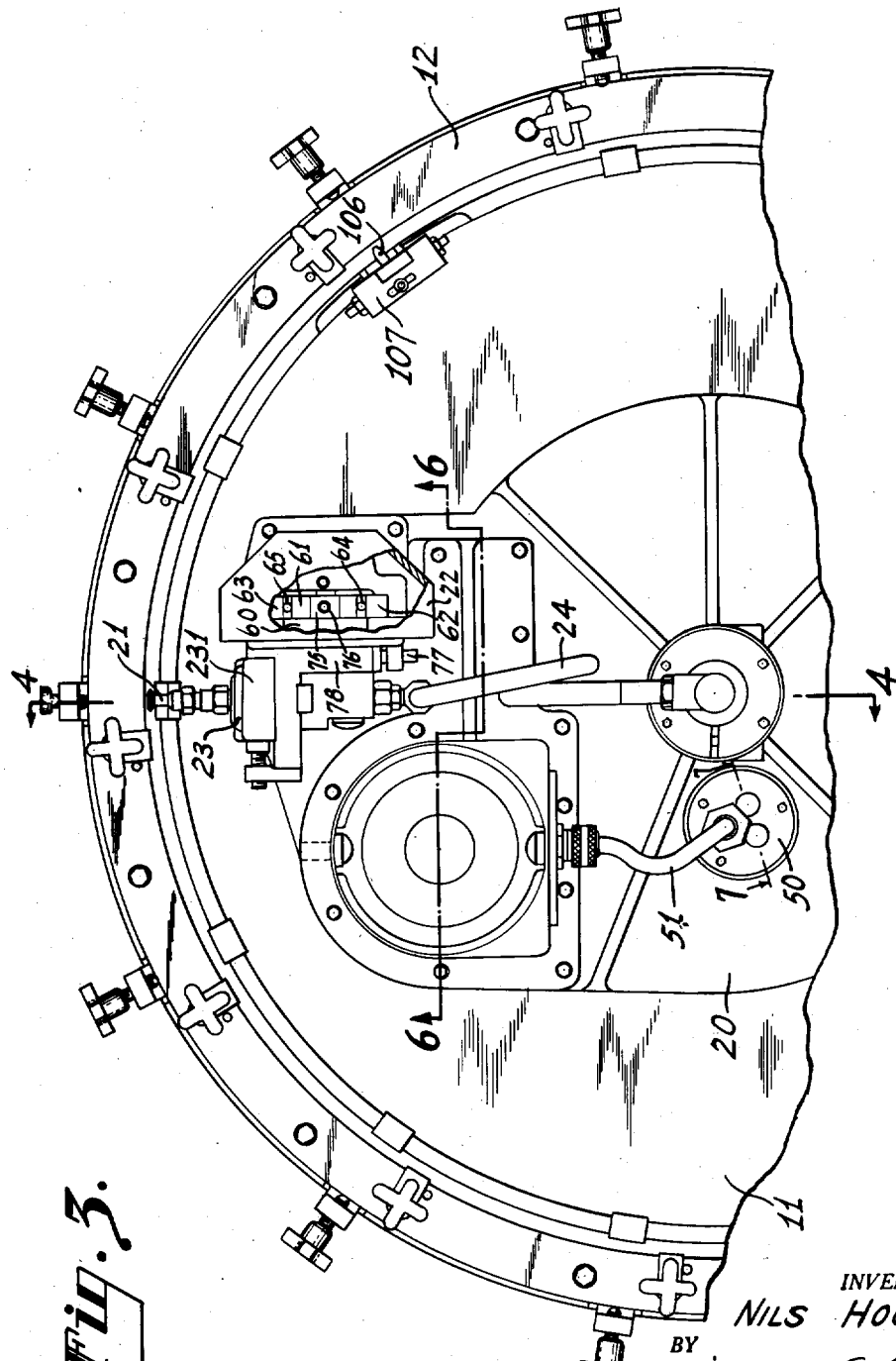
Fig. 3 is a partial plan view of Fig. 1 with parts broken away to show details of construction.

Referring to Fig. 1, one form of the apparatus made in accordance with my invention includes a base 10 upon which is supported the main frame 11 which, in turn, supports the clamping ring 12 for holding the work piece 13, in this case a stator ring 13 which is to be finished.

Mounted for rotation about a vertical axis is the platform or table 20 which serves as the tool and slide mechanism support as well as the support for the driving means, in this case the electric motor shown generally at 25. The grinding or breaking tool 21 which is in effect a small milling cutter and the slide assemblies shown generally at 22 to which the tool 21 is connected for movement in a vertical direction as the table rotates on its axis are all mounted on table 20. The tool is driven by an air motor 23 supplied by air under pressure through the hose 24 in a manner to be described. The motor which is mounted within a motor housing and is connected through gear mechanism to be described to a fixed gear on the main frame to cause rotation of the supporting table. This motor also operates a cam to be described which cooperates with the slide assemblies to cause movement of the tool along a predetermined path both in a vertical direction and in a circular path to remove the sharp edges on the stator dovetails.

Briefly, when the driving motor 25 is energized, it causes the platform 20 to rotate around a vertical axis carrying the tool 21 in a circular path. The cam and slide mechanism control the tool 21 so that it automatically moves through a predetermined path and, although the rotating table is continuously rotating, gives the effect of being indexed between milling positions. The grinding wheel 21 of the tool passes over the end edges of the dovetail portions of the stator ring adjacent the broached portions. While shown connected to a milling tool the novel mechanism to be described can be used with other tools which travel in the path described.

*Table driving mechanism*

Referring now to Figs. 2, 3, 4, and 6, the details of the table and driving mechanism will be described. Supported on the main frame 11 is the bearing housing 30 provided with a downwardly extending hollow central portion 31 in which, in turn, are supported the two supporting bearings 32 and 33. The hollow table shaft or spindle 34 is mounted for rotation and support in the bearings 32 and 33. The spindle 34 supports at its upper end the tool supporting table or platform 20.

On the top of the bearing housing 30 is fixedly mounted and supported a ring gear 35. A driving motor 36 (see particularly Fig. 6) is mounted within the housing 25 and is connected through gears 37 and 38 to the drive shaft 39, mounted in bearings 42 and 43. Shaft 39 has mounted thereon and fixed thereto a worm gear 40 meshed with the gear 35. The shaft 39 also supports the cam 41 which operates the slides in a manner to be described.

Figure 4:
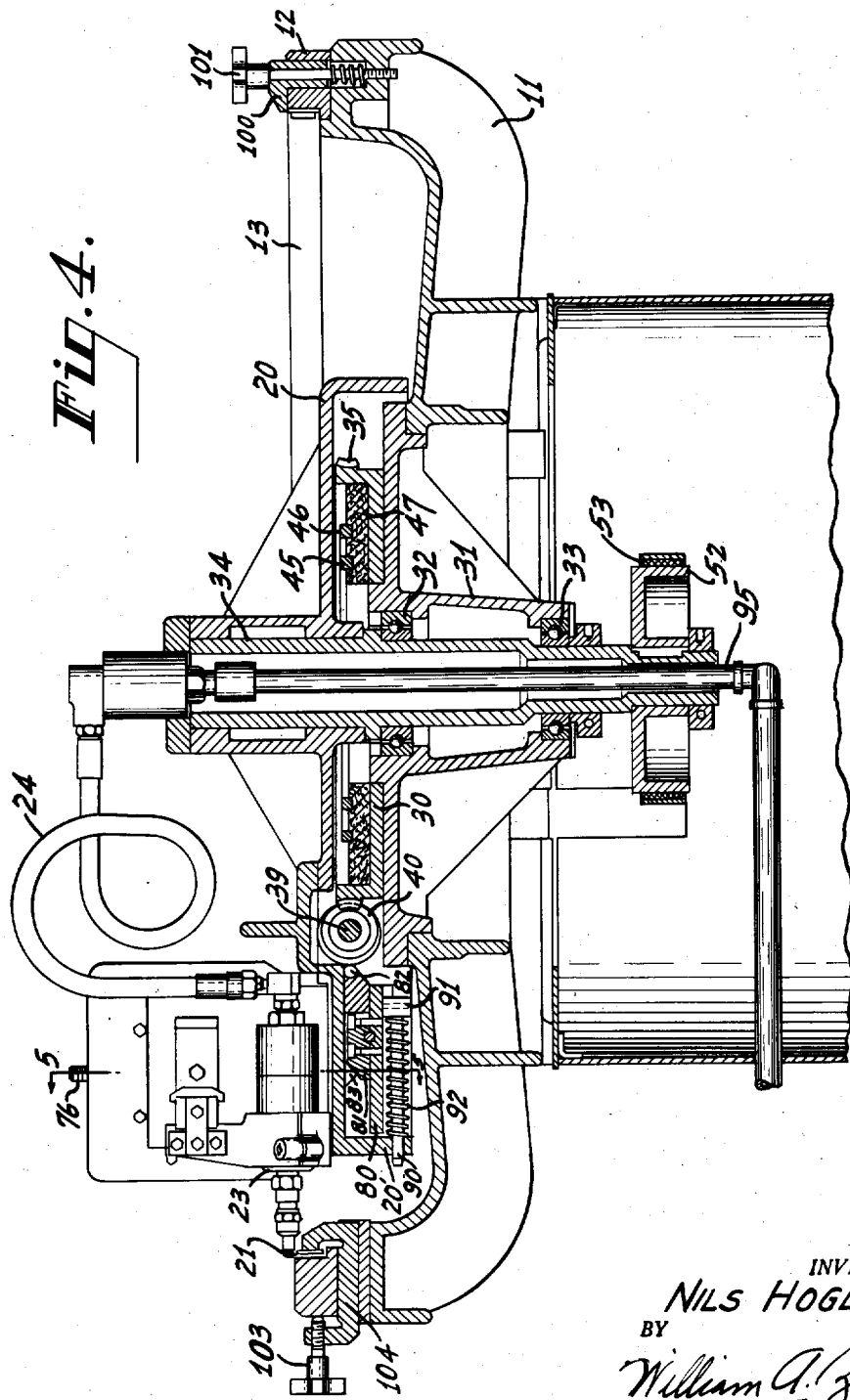
Fig. 4 is a section taken along the line 4—4 of Fig. 3.

In order to provide power to the driving motor 36, I mount a pair of contact rings 45 and 46 (see Fig. 4)

on an insulating support ring 47 which in turn is supported within the gear wheel 35. A pair of contact brushes 48 and 49 are supported in the connector block 50 to which the motor cable 51 is connected. (See Fig. 7.)

To prevent back lash of the hollow shaft 34 and table 30, hollow shaft 34 is provided at its lower end with a brake drum 52 cooperating with the fixed brake member or brake band 53 operated in the usual manner by a brake arm not shown.

It is obvious that if the motor 36 is energized, shaft 39 will be rotated by gears 37 and 38 and hence the gear 40 and cam 41 fixed to shaft 39 will also be rotated. Since gear 40 is meshed with the ring gear 35, rotation of the table 20 results in carrying the tool around the periphery of the frame 11.

Tool slide assembly

Referring to Figs. 2, 3, 4 and 5, the tool slide assembly will be described. Briefly, a slide is carried by the table 20 to move back and forth in a radial direction by means of cam 41. This, in turn, is operably connected to a second follower movable in a plane normal to the rotation of the table or in a vertical direction and carries with it the tool 21. Thus as the table is rotated due to the action of the cam and the slides, the tool is moved back and forth in a vertical direction so that the tool follows a predetermined path.

The tool 21 and its air turbine driving motor 23 are supported on a plate 60 which in turn is secured to a slide 61 mounted in vertical slide guides 62, 63 (see Figs. 3 and 5) by means of ball bearing assemblies 64 and 65. These guides and slide are mounted in the housing 66 supported on platform 20. Mounted on the slide 61 by means of member 69 is the spring guide 67 which supports biasing spring 68. This spring is compressed between the upper end of the housing 66 and guide support 69. This spring urges the slide 61 downwardly against a movable cam 81 to be described and carried by the radially movable slide 80.

Means are provided for adjustment of the tool support both vertically and horizontally. The plate 60 carries the screw members 70 and 71 which extend through slots 72 and 73 in the slide 61 and engage a back plate 74 to secure the member 60 to the slide 61. The upper end of plate 60 carries a threaded extension 75. The screw 76 rotatably mounted on slide 61 engages the threaded portion 75 to raise and lower plate 60 on slide 61. By loosening screws 70 and 71, the plate 60 may be raised or lowered by screw 76 after which screws 70 and 71 can be tightened to fix the plate 60 on the slide 61. Radial movement can be accomplished in a somewhat similar manner by micrometer screw 77 for moving member 78 on which the motor 23 and tool 21 are mounted. Member 78 is slidable on plate 60.

Radial slide

Description of the radial slide follows referring particularly to Figs. 4, 5, and 6. Mounted on the underside of table 20 beneath slide 61 is the radial slide 80 on which is mounted cam 81 to which is secured cam follower 82. The lower end of slide 61 is provided with an extended end 83 which serves as a cam follower and is in contact with cam 81. Cam follower 82 is in contact with the cam 41 on the shaft 39 driven by motor 36. The slide 80 is mounted by means of ball bearing assemblies 84 and 85 in guides 86 and 87.

Mounted on the underside of slide 80 by means of the extension 91 is the spring guide pin 90. The pin slides through an opening in the lip 20' of table 20. A biasing spring 92 is mounted on pin 90 and compressed between lip 20' and extension 91. It urges the slide 80 radially inward against cam 41.

It will thus be seen as the cam 41 rotates, the slide 80 is moved back and forth in a radial direction due to contact by the follower 82 with the cam 41. The vertically movable slide 61 which carries the tool and its motor is caused to move vertically up and down due to contact of cam follower 83 with the cam 81. Thus, simultaneous rotation and vertical movement of the tool is obtained.

Tool motor

The motor 23 is energized by air under pressure which is fed to the motor by means of a conduit 95 extending up through the spindle or shaft 34 and is coupled to the motor by means of the coupling hose 24.

The work piece holding means, which is mounted on the main frame 11 is comprised of a fixture ring 12 and a plurality of clamps 100 and tightening screws 101, and also a plurality of radial clamps 104 having tightening screws 103. Clamps 100 locate the part to be worked on horizontally and clamps 104 locate the part to a true radial location against fixture ring 12. Pilot pin 106 supported in an adjustable slide 107 is used for locating the two halves of the fixture ring to be worked on in the proper relationship to the movement of the carbide cutter or miller 21. Pilot pin 106 is mounted on a clamp similar in construction to clamp 104 with the exception that it has an adjustable slide 107 which supports the pilot pin 106 instead of a clamp.

Operation

Briefly, when it is desired to finish the surfaces of the work piece, in this case stator ring 13 at the ends of the dovetails, the stator ring is mounted on the clamping ring 12 and clamped in place, adjustment being made to carefully center the ring on the axis of rotation by means of pilot pin 106. The electric driving motor 36 is energized after air under pressure is directed to the fluid motor 23 of tool 21. As the motor 36 rotates the shaft 39 with its worm gear 40 and cam 41, due to contact of the gear 40 with the fixed gear 35, the table 20 is caused to rotate about a vertical axis. At the same time the cam 41 engaging the follower of the radially movable slide 80 causes slide 80 to move back and forth in a radial direction. In turn the vertically movable slide 61 upon which the tool 21 and its driving motor 23 are mounted moves back and forth in a vertical direction. The speed of rotation of the table and the movement of the tool in a vertical direction is such that although the table rotates continuously, the tool self-indexes so that the proper circular and vertical movement of the tool produces movement along a predetermined path necessary to finish the proper contour on the edges of the portions of the stator ring between the lands.

As will be seen from the above description, one of the more important features of the present design is the combination of a stationary gear or worm wheel engaged by a worm gear which drives a supporting member in such manner that for each revolution of a cam positively associated with said worm gear and for each even divisible portion of a revolution of the cam, the rotating supporting member will move through a predetermined distance around the periphery of the part being worked. Thus the supporting member is indexed relative to said part in such manner that a secondary movement caused by the cam on the shaft will cause the cutting and working tool to follow the pattern required for the machining of the part. In other words, the one shaft driven by a prime mover, in this case an electric motor, does both of what can be referred to as indexing and positioning of the tool as well as producing the specific movement required of the tool for each position.

I claim:

1. Apparatus for moving a tool simultaneously through a circular path and a path normal thereto whereby indexing and specific movement of the tool for each index is accomplished comprising a base, means on said base rotatable about an axis including a rotatable supporting member, a first slide mounted on said supporting member for movement in a direction normal to said rotation, a tool supported thereon, a second slide on said supporting member movable in a radial direction and contacting said first slide, a motor supported on said supporting member, a shaft connected to and driven by said motor, a worm gear and a cam mounted on said shaft, said cam contacting said second slide, a gear fixed to said base and in mesh with said worm gear whereby energization of said motor causes said supporting member to rotate about its axis and said tool to move in a direction normal to said rotation.

2. Apparatus for moving a tool simultaneously through a circular path and a path normal thereto whereby indexing and specific movement of the tool for each index is accomplished comprising a base means on said base rotatable about an axis including a rotatable supporting member, a first slide mounted on said supporting member for movement in a direction normal to said rotation, a tool supported thereon, a second slide on said supporting member movable in a radial direction and contacting said first slide, a motor supported on said supporting member, a shaft connected to and driven by said motor, a worm gear and a cam mounted on said shaft, said cam contacting said second slide, a gear fixed to said base and in mesh with said worm gear whereby energization of said motor causes said supporting member to rotate about its axis and said tool to move in a direction normal to said rotation, and means on said base for supporting a work piece adjacent the circular path of said tool.

3. Apparatus for moving a tool simultaneously through a circular path and a path normal thereto whereby indexing and specific movement of the tool for each index is accomplished, comprising a base, means on said base rotatable about an axis including a rotatable supporting table, a first slide mounted on said table spaced from said axis and movable in a direction normal to said rotation, a tool supported thereon, a second slide mounted on said table and movable in a radial direction and contacting said first slide, an electric motor supported on said table, a shaft connected to and driven by said motor, a worm gear and a cam mounted on said shaft, said cam contacting said second slide, a gear fixed to said base and in mesh with said worm gear whereby energization of said motor causes said table to rotate about its axis and said tool to move in a direction normal to said rotation, contact rings insulatingly supported by said base and adapted to have a voltage applied thereto, and contact terminals connected to said motor and in sliding contact with said rings, and means for supporting a work piece adjacent the circular path of said tool.

4. Apparatus for moving a rotatable tool simultaneously through a circular path and a path normal thereto whereby indexing and specific movement of the tool for each index is accomplished, comprising a base, a rotatable supporting table mounted on said base, a first slide on said table adjacent the periphery thereof and movable in a direction normal to said rotation, a rotatable fluid operated tool supported on said first slide, a second slide mounted on said table and movable in a radial direction with respect to rotation of said table and contacting said first slide, a motor supported on said table, a shaft connected to and driven by said motor, a worm gear and a cam mounted on said shaft, said cam contacting said second slide, a gear fixed to said base and in mesh with said worm gear whereby energization of said motor causes said table to rotate about its axis and said tool to move in a direction normal to said rotation.

5. Apparatus for moving a rotatable tool simultaneously through a circular path and a path normal thereto whereby indexing and specific movement of the tool for each index is accomplished, comprising a base, a rotatable supporting table mounted on said base, a first slide on said table adjacent the periphery thereof and movable in a direction normal to said rotation, a rotatable fluid operated tool supported on said first slide, a second slide mounted on said table and movable in a radial direction with respect to rotation of said table and contacting said first slide, a motor supported on said table, a shaft connected to and driven by said motor, a worm gear and a cam mounted on said shaft, said cam contacting said second slide, a gear fixed to said base and in mesh with said worm gear whereby energization of said motor causes said table to rotate about its axis and said tool to move in a direction normal to said rotation and means for supporting a work piece adjacent the circular path of said tool.

6. Apparatus for moving a rotatable tool simultaneously through a circular path and a path normal thereto whereby indexing and specific movement of the tool for each index is accomplished, comprising a base, a hollow shaft on said base, a rotatable supporting table mounted on said hollow shaft, a first slide on said table spaced from said hollow shaft and movable in a direction normal to said rotation, a rotatable fluid operated tool supported on said first slide, a second slide mounted on said table and movable in a radial direction with respect to the hollow shaft and contacting said first slide, a motor supported on said table, a shaft connected to and driven by said motor, a worm gear and a cam mounted on said last shaft, said cam contacting said second slide, a gear fixed to said base and in mesh with said worm gear whereby energization of said motor causes said hollow shaft and table to rotate about their axis and said tool to move in a direction normal to said rotation.

7. Apparatus for moving a rotatable tool simultaneously through a circular path and a path normal thereto whereby indexing and specific movement of the tool for each index is accomplished, comprising a base, a hollow shaft on said base, a rotatable supporting table mounted on said hollow shaft, a first slide on said table spaced from said hollow shaft and movable in a direction normal to said rotation, a rotatable fluid operated tool supported on said first slide, a second slide mounted on said table and movable in a radial direction with respect to the hollow shaft and contacting said first slide, an electric motor supported on said table, a shaft connected to and driven by said motor, a worm gear and a cam mounted on said last shaft, said cam contacting said second slide, a gear fixed to said base and in mesh with said worm gear whereby energization of said motor causes said hollow shaft and table to rotate about their axis and said tool to move in a direction normal to said rotation, contact rings insulatingly supported by said base concentric with said fixed gear and adapted to have a voltage applied thereto, and contact terminals connected to said motor and in sliding contact with said rings.

References Cited in the file of this patent

UNITED STATES PATENTS

| 1,460,525 | Wickland | July 3, 1923 |
| 1,673,987 | Nesbitt | June 19, 1928 |
| 1,995,027 | Glassford | Mar. 19, 1935 |
| 2,016,574 | Meyers et al. | Oct. 8, 1935 |
| 2,213,305 | Cook | Sept. 3, 1940 |
| 2,660,930 | De Vlieg et al. | Dec. 1, 1953 |
| 2,791,157 | Calhoun | May 7, 1957 |